(12) United States Patent
Beerbower et al.

(10) Patent No.: US 8,868,546 B2
(45) Date of Patent: Oct. 21, 2014

(54) QUERY EXPLAIN PLAN IN A DISTRIBUTED DATA MANAGEMENT SYSTEM

(75) Inventors: Tom Beerbower, Holland, PA (US); Robert H. Lee, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/420,324

(22) Filed: Mar. 14, 2012

(65) Prior Publication Data

US 2013/0073538 A1 Mar. 21, 2013

Related U.S. Application Data

(60) Provisional application No. 61/535,227, filed on Sep. 15, 2011.

(51) Int. Cl.
*G06F 17/30* (2006.01)
*G06F 7/00* (2006.01)

(52) U.S. Cl.
CPC .... *G06F 17/30545* (2013.01); *G06F 17/30595* (2013.01); *G06F 17/30433* (2013.01); *G06F 17/30445* (2013.01); *G06F 17/30463* (2013.01); *G06F 17/30474* (2013.01)
USPC .......................................... 707/718

(58) Field of Classification Search
USPC ......................... 707/741, 714, 718
See application file for complete search history.

(56) References Cited

U.S. PATENT DOCUMENTS

| | | | |
|---|---|---|---|
| 5,592,668 A * | 1/1997 | Harding et al. ....................... | 1/1 |
| 6,195,653 B1 | 2/2001 | Bleizeffer et al. | |
| 6,980,985 B1 * | 12/2005 | Amer-Yahia et al. ................. | 1/1 |
| 7,185,000 B1 | 2/2007 | Brown et al. | |
| 7,634,456 B2 * | 12/2009 | Yagoub et al. ......................... | 1/1 |
| 7,984,043 B1 * | 7/2011 | Waas ............................. | 707/718 |
| 2002/0198863 A1 * | 12/2002 | Anjur et al. ........................ | 707/1 |
| 2004/0030739 A1 | 2/2004 | Yousefi | |
| 2006/0041599 A1 * | 2/2006 | Tsuchida et al. ............... | 707/200 |
| 2008/0133456 A1 * | 6/2008 | Richards et al. .................. | 707/2 |
| 2008/0256025 A1 * | 10/2008 | Bestgen et al. ..................... | 707/2 |
| 2009/0259641 A1 * | 10/2009 | Balmin et al. ..................... | 707/4 |
| 2010/0030741 A1 * | 2/2010 | Johnson et al. .................... | 707/3 |
| 2010/0235349 A1 * | 9/2010 | Kuno et al. ................... | 707/718 |
| 2010/0241629 A1 * | 9/2010 | Tatemura et al. ............. | 707/741 |
| 2011/0228668 A1 * | 9/2011 | Pillai et al. ..................... | 370/217 |

(Continued)

OTHER PUBLICATIONS

Kossmann, D., The State of the Art in Distributed Query Processing, ACM Computing Surveys, ACM, New York, NY, US, vol. 32, No. 4, Dec. 1, 2000, pp. 422-469.

(Continued)

*Primary Examiner* — Kuen Lu
(74) *Attorney, Agent, or Firm* — Meyer IP Law Group

(57) ABSTRACT

A query explain plan is described for use with a distributed data system in order to help developers and IT experts to detect bottlenecks and to determine which queries are to blame for a slow running system. In accordance with an embodiment, the distributed data grid utilizes a facility to provide a distributed explain plan. This distributed explain plan provides visibility into how a query was answered by each node in the cluster. For example, one node may have applied the filters of the query in one sequence, while another node may have used a different sequence. Additionally, the distributed query explain plan can provide execution tracing, rendering information about the execution time of each step, total execution time and the like.

19 Claims, 3 Drawing Sheets

(56) References Cited

U.S. PATENT DOCUMENTS

| | | | |
|---|---|---|---|
| 2011/0246448 A1* | 10/2011 | Tatemura et al. | 707/714 |
| 2011/0302151 A1* | 12/2011 | Abadi et al. | 707/714 |
| 2011/0302583 A1* | 12/2011 | Abadi et al. | 718/102 |
| 2012/0166424 A1* | 6/2012 | Annapragada | 707/718 |
| 2012/0317447 A1* | 12/2012 | Yildiz et al. | 714/48 |
| 2013/0073538 A1* | 3/2013 | Beerbower et al. | 707/718 |

OTHER PUBLICATIONS

International Search Report dated Feb. 18, 2013, International Application No. PCT/US2012/054680 filed Sep. 11, 2012.

European Patent Office, International Searching Authority, International Search Report and Written Opinion dated Feb. 18, 2013 for International Application No. PCT/US2012/054680, 12 pages.

* cited by examiner

```
NamedCache cache = CacheFactory.getCache("dist-person");

cache.addIndex(new ReflectionExtractor("getAge"), true, null);
...

Filter filter = new AllFilter(new Filter[]
    {
    new OrFilter(
            new EqualsFilter(new ReflectionExtractor("getAge"), 16),
            new EqualsFilter(new ReflectionExtractor("getAge"), 19)),
    new EqualsFilter(new ReflectionExtractor("getLastName"), "Smith"),
    new EqualsFilter(new ReflectionExtractor("getFirstName"), "Bob"),
    });

QueryRecorder agent = new QueryRecorder(RecordType.EXPLAIN);

Object resultsExplain = cache.aggregate(FILTER, agent);
```

FIGURE 2A

```
Explain Plan=

Explain Plan
Name                                      Index         Cost
==============================================================================
com.tangosol.util.filter.AllFilter    | ----        | 0
  com.tangosol.util.filter.OrFilter   | ----        | 0
    EqualsFilter(.getAge(), 16)       | 0           | 1
    EqualsFilter(.getAge(), 19)       | 0           | 1
  EqualsFilter(.getLastName(), Smit   | 1           | 1500000
  EqualsFilter(.getFirstName(), Bob   | 2           | 1500000

Index  Lookups
Index  Description                                  Extractor
Ordered
==============================================================================
0      SimpleMapIndex: Extractor=.getAge(), Ord    .getAge()          true
1      No index found                              .getLastName()     false
2      No index found                              .getFirstName()    false
```

FIGURE 2B

QUERY EXPLAIN PLAN IN A DISTRIBUTED DATA MANAGEMENT SYSTEM

CLAIM OF PRIORITY

This application claims the benefit of priority on U.S. Provisional Patent Application No. 61/535,227, entitled "QUERY EXPLAIN PLAN IN A DISTRIBUTED DATA MANAGEMENT SYSTEM" filed Sep. 15, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to data caching and accessing techniques in distributed computing environments.

BACKGROUND

In the context of data storage and management, query optimization attempts to determine a most optimal or efficient way to execute a given query. Because structured query language (SQL) is declarative, there are typically multiple different ways to execute a given query (query plans) and each of those ways yields a different performance while arriving at the same results. A query plan is an ordered sequence of steps used to access or modify information in SQL based data systems. A typical query optimizer considers all the possible query plans for a given query and determines which one of those query plans will be most efficient (produce the least amount of latency).

In distributed data systems where data is stored across many nodes of a cluster, it can be difficult to determine a single optimal query plan for the entire distributed system. For example, depending on the data distribution across the cluster, one query plan may be optimal for some of the nodes in the cluster, while a different query plan will be optimal for other nodes.

BRIEF SUMMARY

In accordance with various embodiments, a query explain plan is described for use in a distributed data system in order to help developers and IT experts to detect bottlenecks and to determine which queries are to blame for a slow running system. In accordance with an embodiment, the distributed data grid utilizes a facility to provide a distributed explain plan. This distributed explain plan provides visibility into how a query was answered by each node in the cluster. For example, one node may have applied the filters of the query in one sequence, while another node may have used a different sequence. Additionally, the distributed query explain plan can provide execution tracing, rendering information about the execution time of each step, total execution time and the like.

BRIEF DESCRIPTION OF THE DRAWINGS

FIGS. 2A and 2B are illustrations of an example of using the query explain plan in accordance with various embodiments of the invention.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments, a query explain plan is provided to a distributed data system in order to help developers and IT experts to detect bottlenecks and to determine which queries are to blame for a slow running system. In accordance with an embodiment, the distributed data grid utilizes a facility to provide a distributed explain plan. This distributed explain plan provides visibility into how a query was answered by each node in the cluster. For example, one node may have applied the filters of the query in one sequence, while another node may have used a different sequence. Additionally, the distributed query explain plan can provide execution tracing, rendering information about the execution time of each step, total execution time and the like.

In accordance with an embodiment, to obtain the query explain plan, a method can be invoked, passing a query as a parameter. The query can be sent to all servers in the cluster and each server can return the determined optimal query plan specific to that server, as well as its execution results. These plans and results can be aggregated across all nodes in the cluster. The result of the method invocation can thus be a data structure that provides information regarding all the query plans across the cluster for that particular query. The facility can also provide means to compare and contrast the different query plans and to reconcile the results.

In accordance with an embodiment, the user can inspect the results of the query explain plan and create indexes to improve the speed of the query. An index is a data structure that can improve the speed of the data retrieval operation by creating a copy of a part of a table or by some other means as known in the art. Based on the results of the query explain plan, users can have a better idea of which tables to create indexes for in order to improve the speed of the system.

Figure 1:
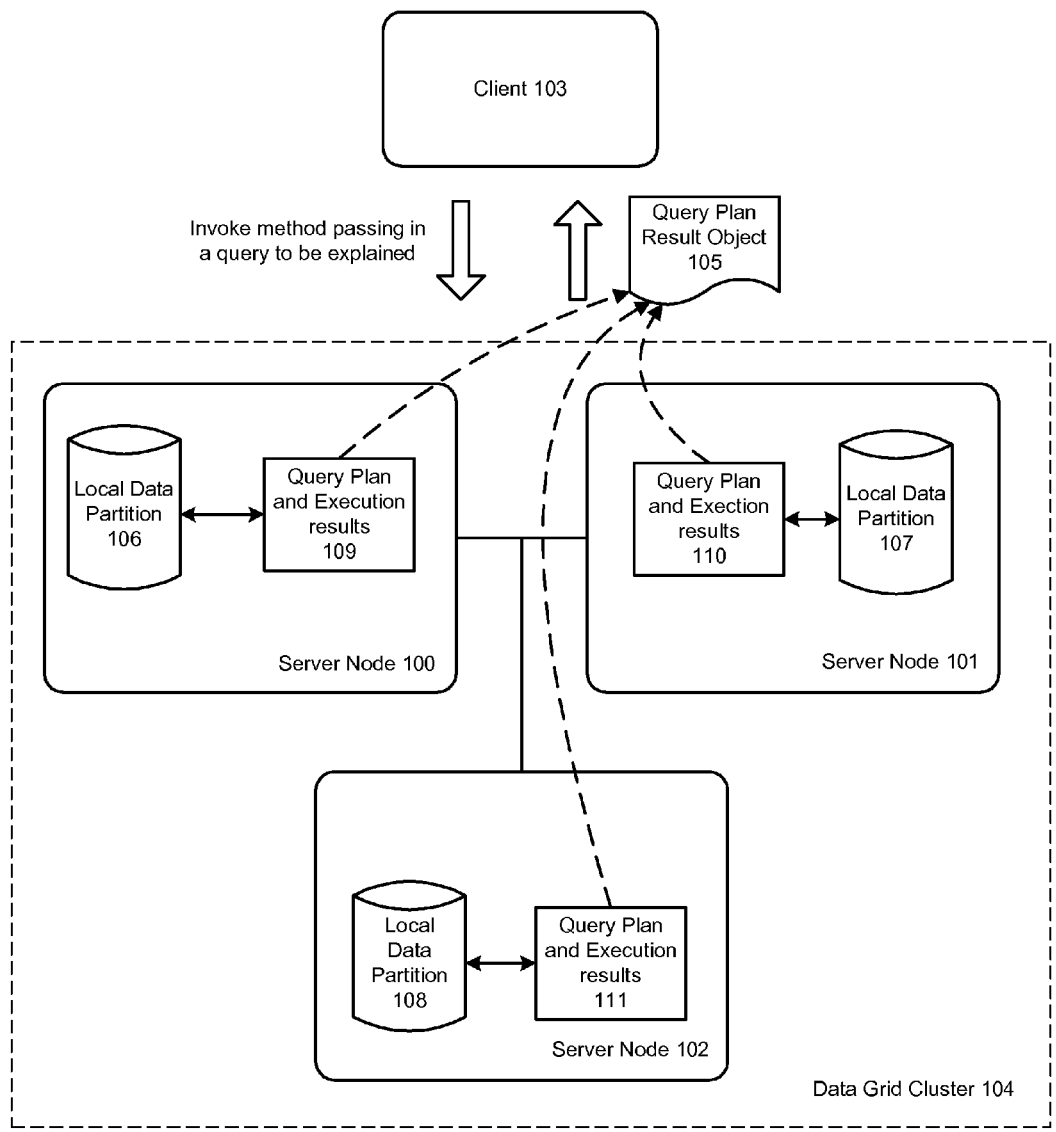
FIG. 1 is a system level diagram of the query explain feature, in accordance with various embodiments of the invention.

FIG. 1 is a system level diagram of the query explain feature, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, a client 103 can connect to a distributed data grid cluster 104 that manages a set of data across multiple servers (100, 101, 102). The client can submit queries to the data in order to obtain the necessary data in a low latency fashion. In addition, as shown in the figure, the client can request a query explain plan from the cluster by providing invoking a method against the grid and passing in a structured query language (SQL) query as a parameter to the method. The query is then distributed to each of the server nodes in the cluster. Each node evaluates the query plan (109, 110, 111) against its own partition of data (106, 107, 108) and returns the results of that query plan as it relates to its locally stored data. The results are then aggregated into a query result object 105 that is returned to the client. The query result object 105 provides information regarding how each node in the cluster evaluated the query plan for the original SQL query locally.

FIGS. 2A and 2B are illustrations of an example of using the query explain plan in accordance with various embodiments of the invention. It should be noted that while this figure includes certain code and data structure, the present embodiments are not limited to the particular code or data structure illustrated herein. Many other implementations are possible within the scope of the present invention, as will be evident to one of ordinary skill in the art.

More specifically, FIG. 2A shows an example of code invoking the query plan and FIG. 2B shows a query record object being returned by the invocation of that code. In accordance with an embodiment, the query record object can be a string that when displayed would render the data illustrated in FIG. 2B.

In accordance with an embodiment, the "Name" field of the query plan results denotes the name of the query plan step. In most cases this would be the invocation of a method "toString" on the filter of the query. The index is a reference to the index lookup if applicable. The "Cost" is the estimated cost as returned from the filter effectiveness calculation.

The results illustrated in FIG. 2B show the filter(s) used for the query steps along with each index (if any), the size of the key set passed to the filter and the results of calculating the effectiveness of using the filter. For example, the results above can be for a query explain plan run against a cache with a 1000 entries in a cluster with 4 storage nodes.

It should be noted that the above is just an example of what the query plan results may look like. It may be possible to aggregate the partial results of the query plan in various other meaningful ways. The following describes an architecture that will allow customization of the query plan results by extending the query plan aggregator and implementing a custom query plan results object.

Calculated Effectiveness

In accordance with an embodiment, the calculated effectiveness is an estimated measure of how well a filter can use a collection of indexes to filter a set of keys. This value can be used to determine the placement of filters in an ArrayFilter so that the most effective filters are applied first. The value returned from IndexAwareFilter.calculateEffectiveness is really the estimated evaluation cost of applying the filter.

As an illustration, Table 1 below shows a query for used cars where make=Honda and cost <7000, with an index on make.

TABLE 1 cache.addIndex(new ReflectionExtractor("getMake"), true, null);
...
Filter filter = new AndFilter(
   new EqualsFilter(new ReflectionExtractor("getMake"), "Honda"),
   new LessFilter(new ReflectionExtractor("getCost"), 7000));
Set keys = cache.keySet(filter);

In accordance with an embodiment, the effectiveness for each filter in the example illustrated in Table 1 would be calculated as follows:

Equals Filter—Since there is an index that could be applied, the calculated effectiveness is given as 1. The value of 1 is used since the operation of applying the index will require just a single access to the index content. This is a pure evaluation cost value since this says nothing about how effectively the index would reduce the given key set. For example, if the cache only contains Hondas, then the application of this filter may be cheap, but not effective. If there was no index that could be applied here, then the calculated effectiveness would be EVAL_COST multiplied by the number of keys. EVAL_COST is a constant value, currently set at 1000. This is intended to show the relative cost of doing a full scan to reduce the key set. As stated above, this value is purely an evaluation cost and says nothing about the actual effectiveness of the operation to reduce the key set.

Less Filter—Since there is no index that could be applied here, the calculated effectiveness would be EVAL_COST multiplied by the number of keys.

And Filter—The calculated effectiveness of this filter is based on the effectiveness of the filters that make it up. In this example, the calculated effectiveness of the Equals Filter is 1 and the calculated effectiveness of the Less Filter is some value based on the number of keys. The underlying filters are weighted based on their calculated effectiveness in an ordered list with the most effective (actually least costly) coming first. The calculated effectiveness of this And Filter is the calculated effectiveness of the first filter in its list of filters.

In this example, the given set of keys would be reduced by the Equals Filter first and the Less Filter second. If there was no index on the make attribute but there was an index on cost then it would likely be reversed with the Less Filter being applied first. The current ordering of filters is based primarily on whether or not there is an index that can be applied. Whether or not this produces the best plan depends on the actual effectiveness (the ability of the filter to reduce the key set) of applying the filter.

If the index is taken out of the equation then both filters would return the same calculated effectiveness (EVAL_COST multiplied by the number of keys). This means that one cannot tell which filter would be applied first. In order to determine which would be best, an actual effectiveness would need to be calculated. For example, if only 2% of the entries in the cache are Hondas and 99% cost less than $7000 then it makes sense to apply the Equals Filter first since that would reduce the key set the most. Conversely, if all the entries in the cache are Hondas, then it makes sense to apply the Less Filter first since the Equals Filter would have no effect in reducing the key set.

It may be possible in some cases to make assumptions and take an educated case about effectiveness without actually applying the filter. For example, an Equals Filter with an index. Instead of only returning 1, the estimate can be enhanced by including the key set reduction factor:

```
Set setMatch = (Set) mapIndex.getIndexContents( ).get(getValue( ));
factorReduction = setKeys.size( ) / setMatch.size( )
```

A variation of this value could be used as the effectiveness/cost.

Figure 3:
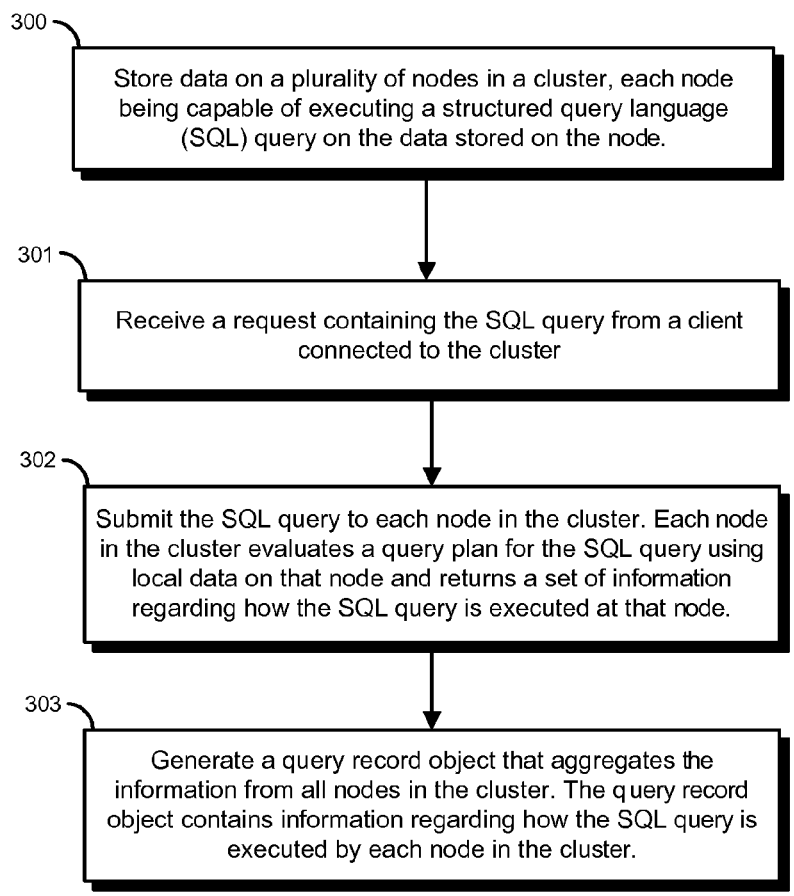
FIG. 3 is a flow chart diagram of providing the query explain plan in accordance with various embodiments of the invention.

FIG. 3 is a flow chart diagram of providing the query explain plan in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, data is stored on a plurality of nodes in a cluster, each node being capable of executing a structured query language (SQL) query on the data stored on said node. In step 301, a request is received containing the SQL query from a client connected to the cluster. In step 302, the SQL query is submitted to each node in the cluster. Each node in the cluster evaluates a query plan for the SQL query using local data on that node and returns a set of information regarding how the SQL query is executed at that node. In step 303, a query record object is created that aggregates the information from all nodes in the cluster. The query record object contains information regarding how the SQL query is executed by each node in the cluster.

In accordance with various embodiments, the query explain plan can provide a method for gathering statistics and calculating a cost for running a query in the distributed data system. It can be done on a per request basis, and does not need to be performed as part of every query. In accordance with one embodiment, the explain plan process does not actually need to run the query but can instead calculate a cost of running a query with the given filter. The implementation of the query explain plan feature does not need to impact query performance in the distributed data system. The results of the explain plan should be consumable for a non programmer such that IT can add missing indices. Existing methods for calculating effectiveness of applying an index during filter evaluation can be examined and implemented to improve query performance and provide meaningful values for the explain plan. The implementation of the query explain plan can be used with a trace feature. Trace is similar to explain except that it would actually run the query and provide additional statistics about the query performance.

In accordance with an embodiment, the query explain plan facility can be executed in at least two modes: an explain mode and a trace mode. In the explain mode, the facility does not actually execute the query, but simply returns the query plans for each cluster member. In trace mode, the facility executes the query and returns the actual performance metrics on each node in the cluster, including for example the execution time of applying each filter and the sequence in which the filters were applied.

Architecture

Below are some examples of the various objects that can be used to enable the query explain feature in the distributed cache. It is noted that these objects are provided purely for purposes of illustration and are not intended to be limiting to all embodiments of the invention.

QueryRecorder—A QueryRecorder aggregator can be used for obtaining a query record. This aggregator can serve as both a signal to the distributed data grid that a query explain plan is being requested as well as an actual aggregator of explain plan results. The QueryRecorder will be created with one of two types; EXPLAIN or TRACE. Creating a QueryRecorder with EXPLAIN will produce a QueryRecord object that contains an estimated cost of the query execution. Creating a QueryRecorder with TRACE will produce a QueryRecord object that contains the actual cost of the query execution. In other words, doing a trace aggregation will actually execute the query and record the effectiveness (ability to reduce the entry set) at each filter step while an explain aggregation will simply walk each step and record an estimated cost (as described above).

QueryRecorderFilter—A filter interface that can extend EntryFilter can be created. In accordance with an embodiment, all filters will implement this interface. This interface includes new methods for explaining and tracing the filter. For most filters the call to explain will calculate the effectiveness of applying the filter through IndexAwareFilter.calculateEffectiveness and record this information as part of a query.

Filter Implementations—The standard implementation of explain for most filters will simply record information about the application of the filter into a query record step. This information may include the size of the key set prior to applying the filter, the size of the key set after applying the filter, the duration and the actual or estimated cost of applying the filter. For filters that extend ArrayFilter, the implementation of explain will create a new query record step for each sub filter and call explain on each. Users can be enabled to implement or extend QueryRecorderFilter. Filters that do not extend QueryRecorderFilter will still be explainable or traceable in the default manner.

QueryContext—The explain and trace methods of the QueryRecorderFilter include the use of a query context. The context can provide access to a backing map context which will be initialized with any information required to perform a query scan (e.g. the map of indexes).

QueryRecord—The QueryPlan interface defines the standard results object returned from a query plan operation. Since QueryPlanAggregator can be extended, and the return type of aggregateResults is Object, the use of the QueryPlan interface is not required. The QueryPlan interface includes an addResults method that allows the aggregator to combine partial results. The default implementation of QueryPlan can include various methods for accessing the merged results including all of the steps of the query plan. The QueryPlan interface also includes the other interfaces that make up the components of a query plan result, including PartialResults, Step and ContainmentStep.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for explaining queries in a distributed data grid, said system comprising:
   one or more microprocessors;
   a cluster running on the one or more microprocessors, including a plurality of cluster nodes storing data distributed throughout the cluster, each cluster node being capable of executing a structured query language (SQL) query on the data stored on said cluster node,
   wherein the cluster operates to
      receive, from a client connected to the cluster, a request that includes a SQL query;
      submit the SQL query to each node in the cluster and wherein each node in the cluster operates to
         evaluate a query plan for the SQL query using local data,
         determine an optimal query plan that is specific to said each node in the cluster, and
         return a set of information regarding how the SQL query is executed at said each node; and
      use an aggregator to generate a query record object, wherein the query record object aggregates the information from all nodes in the cluster, wherein the query record object contains information regarding how the SQL query is executed by each node in the cluster.

2. The system of claim 1, wherein the query record object further provides execution tracing, rendering information about an execution time of each step and total execution time.

3. The system of claim 1, wherein to obtain the query explain plan, a method is invoked passing an SQL query as a parameter to said method.

4. The system of claim 1, wherein a facility is provided to compare and contrast different query plans and to reconcile results of different query invocations.

5. The system of claim 1, wherein the system is executable in at least two modes: an explain mode and a trace mode, wherein the explain mode produces a query record object that contains an estimated cost of the query execution, and wherein the trace mode contains the actual cost of query execution.

6. The system of claim 1, wherein an index is generated by employing the query record object.

7. The system of claim 1 wherein each node in the cluster executes a different query plan depending on a partition of data stored on the node.

8. The system of claim 1, wherein the aggregator operates to serve as a signal to each node of the plurality of cluster nodes in the cluster that a query explain plan is requested.

9. The system of claim 1, wherein the aggregator operates to combine partial results into the query record object via an interface.

10. The system of claim 1, wherein a first optimal query plan for the SQL query that is specific to a first cluster node is different from a second optimal query plan for the SQL query that is specific to a second cluster node.

11. The system of claim 10, wherein the first optimal query plan applies one or more filters of the SQL query in a first sequence, while the second optimal query plan applies said one or more filters of the SQL query in a second sequence, and wherein the first sequence is different from the second sequence.

12. A method for explaining queries in a distributed data grid, said method comprising:
   storing data on a plurality of nodes in a cluster, each node being capable of executing a structured query language (SQL) query on the data stored on said node;
   receiving a request containing the SQL query from a client connected to the cluster;
   submitting the SQL query to each node in the cluster, wherein each node in the cluster operates to
      evaluate a query plan for the SQL query using local data,
      determine an optimal query plan that is specific to said each node in the cluster, and
      return a set of information regarding how the SQL query is executed at said each node; and
   using an aggregator to generate a query record object, wherein the query record object that aggregates the information from all nodes in the cluster, wherein the query record object contains information regarding how the SQL query is executed by each node in the cluster.

13. The method of claim 12, wherein the query record object further provides execution tracing, rendering information about an execution time of each step and total execution time.

14. The method of claim 12, wherein to obtain the query explain plan, a method is invoked passing an SQL query as a parameter to said method.

15. The method of claim 12, wherein a facility is provided to compare and contrast different query plans and to reconcile results of different query invocation.

16. The method of claim 12, wherein the system is executable in at least two modes: an explain mode and a trace mode, wherein the explain mode produces a query record object that contains an estimated cost of the query execution, and wherein the trace mode contains the actual cost of query execution.

17. The method of claim 12, wherein an index is generated by employing the query record object.

18. The method of claim 12, wherein each node in the cluster executes a different query plan depending on a partition of data stored on the node.

19. A non-transitory computer readable storage medium storing one or more sequences of instructions executed by one or more processors to perform a set of steps comprising:
- storing data on a plurality of nodes in a cluster, each node being capable of executing a structured query language (SQL) query on the data stored on said node;
- receiving a request containing the SQL query from a client connected to the cluster;
- submitting the SQL query to each node in the cluster, wherein each node in the cluster operates to
  - evaluate a query plan for the SQL query using local data,
  - determine an optimal query plan that is specific to said each node in the cluster, and
  - return a set of information regarding how the SQL query is executed at said each node; and
- using an aggregator to generate a query record object, wherein the query record object that aggregates the information from all nodes in the cluster, wherein the query record object contains information regarding how the SQL query is executed by each node in the cluster.

\* \* \* \* \*